United States Patent [19]

Rettberg

[11] 4,219,749
[45] Aug. 26, 1980

[54] HOUSING FOR POWER TOOLS

[75] Inventor: Harvey C. Rettberg, Pickens, S.C.

[73] Assignee: The Singer Company, Stamford, Conn.

[21] Appl. No.: 923,414

[22] Filed: Jul. 10, 1978

[51] Int. Cl.³ .............................................. H02K 5/00
[52] U.S. Cl. ..................................... 310/89; 310/50; 310/58
[58] Field of Search ...................... 310/89, 47, 50, 90, 310/51, 52, 58, 239; 30/166 R; 220/3.8, DIG. 25, 241, 242, 352, 356; 174/50

[56] References Cited

U.S. PATENT DOCUMENTS

| | | | |
|---|---|---|---|
| 3,168,613 | 2/1965 | Palmer | 230/3.94 |
| 3,432,703 | 3/1969 | Sheps | 310/51 |
| 3,462,623 | 8/1969 | Batson | 310/50 |
| 3,519,859 | 7/1970 | Morganson | 310/47 |
| 4,075,523 | 2/1978 | Lafferty | 310/239 |
| 4,127,785 | 11/1978 | Noguchi | 310/40 MM |

Primary Examiner—R. Skudy
Attorney, Agent, or Firm—Elliot A. Lackenbach; Robert E. Smith; Edward L. Bell

[57] ABSTRACT

A housing for a power tool having an access aperture for mounting the brushes of a universal motor which is journaled in the housing. Tabs hold the brushes within a recess, and screws are threadedly connected to the housing to clamp the tabs. A cover is substantially "U" shaped and has posts extending inwardly in superposition to the screws to prevent the screws from backing out due to vibration or other loosening thereof.

The cover fits between an upper and a lower housing extension and provides a smooth continuous outer configuration, through which vent slots permit the passage of cooling air.

7 Claims, 3 Drawing Figures

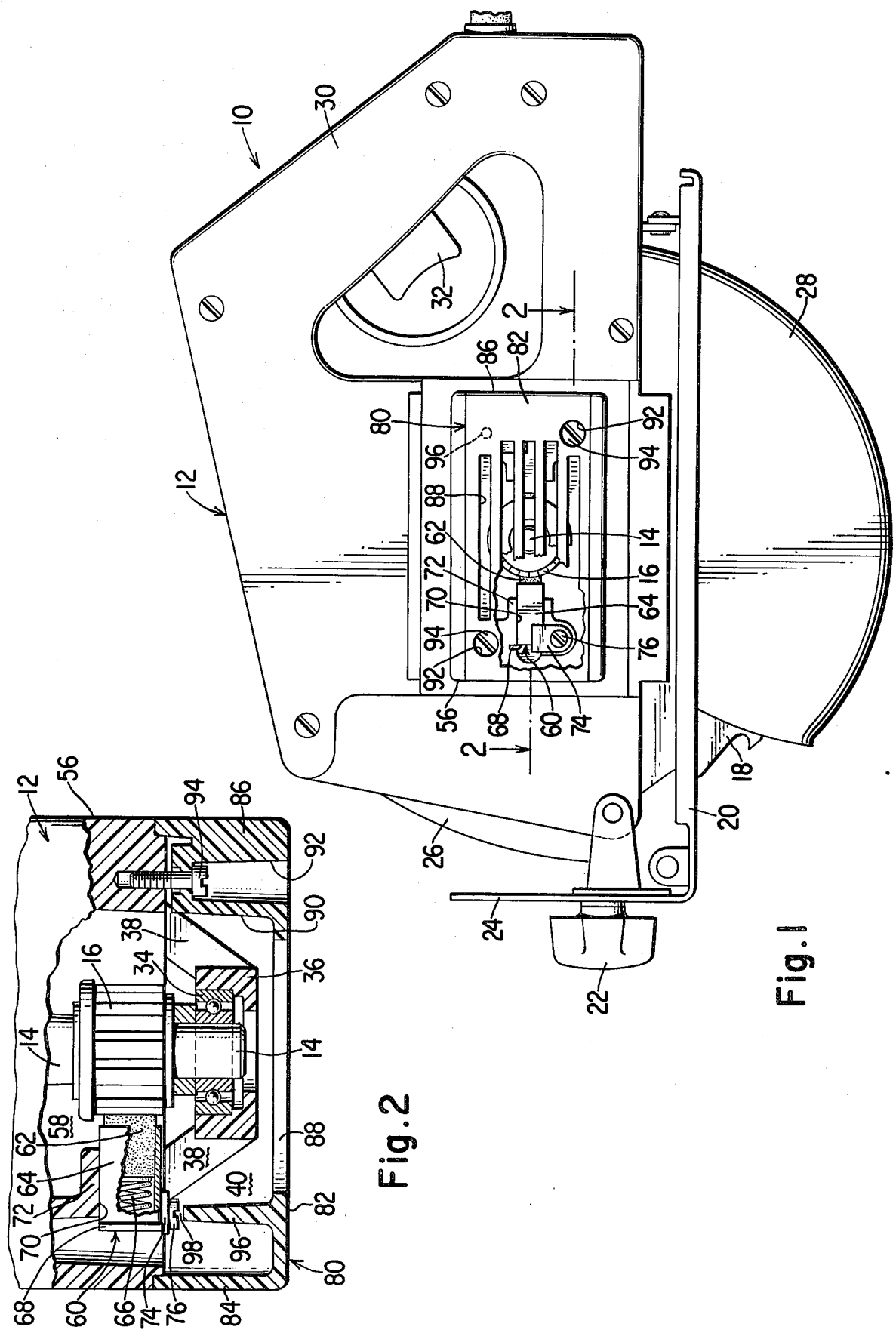

HOUSING FOR POWER TOOLS

BACKGROUND OF THE INVENTION

In the prior art the end caps of the housing would cover the brush assembly but did not include protection against the brush mount screw from backing out. Also if the pair of brushes were enclosed, the shape was usually an inverted cup-shape, or some other type of plate or strip configuration. If individual or a pair of covers were used, it could be "L" shaped. In any event the cover did not fit within top and bottom housing extensions so as to provide both access to the brush assembly and improved strength and continuity of the housing.

SUMMARY OF THE INVENTION

It is an object of the present invention to provide an improved housing for power tools which will overcome the prior art disadvantages; which has a cover with internal posts to prevent the screws from backing out; which has a "U" shaped cover; which cover has vent slots therein; which has upper and lower housing extensions into which the "U" shaped cover fits; and which cover forms a smooth continuous surface with the upper and lower portions of the housing.

Other objects and advantages will be apparent from the following description of the invention and the novel features will be particularly pointed out hereinafter in the claims.

BRIEF DESCRIPTION OF THE DRAWINGS

This invention is illustrated in the accompanying drawings in which:

FIG. 1 is a side elevational view of a power tool having a housing embodying the present invention.

FIG. 2 is a view taken along line 2—2 of FIG. 1.

DESCRIPTION OF THE INVENTION

Figure 3:
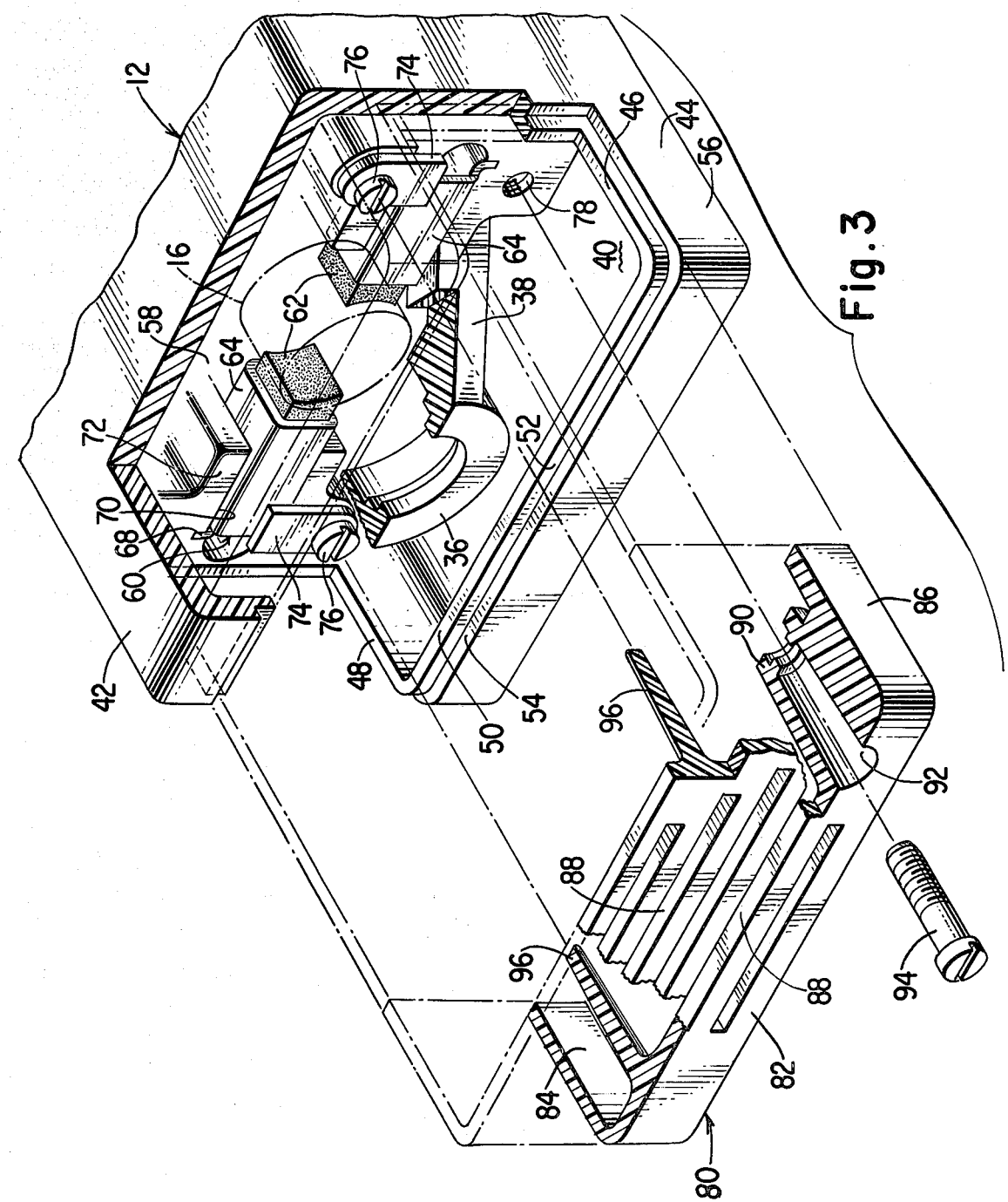
FIG. 3 is an enlarged exploded perspective view, partly in section, of the bearing end of the housing showing the "U" shaped cover with internal posts.

A conventional power tool, as for example, a circular saw 10 is shown in FIG. 1 embodying the present invention. The circular saw 10 is but one typical example of a power tool or other motor actuated appliance to which the present invention is applicable.

The circular saw 10 has a housing 12 in which is mounted a universal motor of which only the armature shaft 14 and commutator 16 affixed thereto is shown in FIGS. 1 and 2. The motor will be cooled by ventilation air being drawn therethrough by a conventional fan (not shown). The motor will power a saw blade 18 whose teeth are exposed below a base plate 20. The base plate 20 is suitably interconnected to the housing 12 to permit adjustment of the angle of cut, and the depth of cut, with only one of the adjustment members 22 being shown in FIG. 1 clamping a base bracket 24 in the straight cut at maximum depth of cut. A stationary upper guard 26 is formed in the housing 12 and interacts to receive a retractable spring biased lower guard 28 which during the cutting of the workpiece will be pivoted within the upper guard 26.

The housing 12 depicted in FIG. 1 has a handle 30 with a switch 32 mounted therein in circuit with the motor so that when the operator depresses the switch 32 the motor and consequently the saw blade 18 will be activated in the usual manner.

The outer end of the armature shaft 14 is journaled in a ball bearing 34 as illustrated in FIG. 2 affixed in a bearing bracket 36 having a plurality of struts 38 extending from the inner wall of the housing 12. The bracket 36 is rearward of the commutator 16 and disposed centrally of an access aperture 40 which is bounded at the top by an upper portion 42 and at the bottom by a lower portion 44 of the housing 12 which extends thereover. The opposite sides 46 and 48 and the back 50 of access aperture 40 are open. A continuous lip 52 is fomed to run about the inner edges of the upper and lower portions 42 and 44, respectively, so as to form a set back or ledge 54 from the outer surface 56 of the housing 12. The edges of at least two of the walls, such as the upper and lower portions 42 and 44, accordingly, and as shown in FIG. 3, defining the access opening 40 are generally U-shaped, as indicated in FIG. 3, the wall portion edges being identified by the reference characters 46, 48 and 50.

The inside of the housing 12 is hollow, as at 58, so that the motor can be journaled therein, and the hollow 58 is in communication with the access aperture 40. A brush assembly 60, having a pair of brushes 62, is operatively associated with the commutator 16, and engage diametrically opposite sides of the commutator 16. The brushes are slidably received within the tubes 64 wherein springs 66 are trapped to bias the brushes 62 into engagement with the commutator 16. The tubes 64 have outturned end flanges 68 which are engaged in slots in the housing 12 shown in FIGS. 1 and 3 to prevent radial movement of the tubes 64. The tubes 64 are placed in recesses 70 formed in bosses 72 on opposite sides of and in alignment with the commutator 16. The open top of the recesses 70 faces the back opening 50 so as to permit easy access to the brush assembly 60 via aperture 40. Mounting tabs 74 are screw 76 connected at one end to the bosses 72 and have their other end clamp the tubes 64 within the recesses 70 and prevent the tubes from being axially removed. The screws 76 are connected diametrically opposed from each other and as viewed in FIGS. 1 and 3 one is located adjacent the lower left hand corner of the left boss 72 and the other is adjacent the upper right hand corner of the right boss 72. The opposite corner of each boss 72 has a diametrically opposed tapped holes 78, illustrated in FIGS. 2 and 3.

A cover 80, depicted in FIGS. 1, 2 and 3, is formed substantially "U" shaped with a flat base 82 whose ends turn at substantially 90° to form opposed sides 84, 86 respectively. A plurality of horizontal slots 88 are formed to extend across the base 82 and terminate inwardly of the side edges. A pair of diametrically opposed internal bosses 90 are formed adjacent the upper left and lower right corners as viewed in FIGS. 1 and 3. Each boss 90 has a counterbore or recessed opening 92 aligned with the hole 78 so that when the cover 80 is fitted to the housing 12 to enclose the aperture 40, screws 94 are disposed in openings 92 to be threadedly received within the hole 78 to connect the cover 80 to the housing 12.

A pair of posts 96 are formed integrally on the base 82 near diametrically opposite corners of the lower right and upper left as viewed in FIGS. 1 and 3. The posts 96 extend inwardly, parallel to the bosses 90 which are formed in the same vertical line but at opposite pairs of corners. The bosses 90 and the posts 96 each extend inwardly a slightly shorter distance than the length of the sides 84 and 86. The posts 96 are aligned in superposition to the screws 76, and though they may engage, it is preferred to leave a space 98 as illustrated in FIG. 2. The posts 96 have their axes substantially coincident to the axes of the screws 76 so that should one of the screws 76 become loose, because of vibration or the like, it will contact the end of the aligned post 96 and thereby be prevented from loosening any further.

Also, as best seen in FIG. 2, the cover 80 is connected to the housing 12 to have its edge abut the lip 52 and set within the step 54 so as to form a smooth continuous line which lies substantially in the same plane as that of the housing surface 56. The joint between the housing portions 42 and 44 will only be visible by a mating line which requires close inspection to see. Thus the sides 84, 86 and the base 82 will perfectly match the surface lines of the housing portions 42 and 44.

Accordingly by nesting the cover 80 within the aperture 40 within the cantilevered housing portions 42 and 44 a strong, contiguous configuration is possible, while it is a simple matter to remove the cover 80 and provide access to the brush assembly 60 for inspection or replacement of the brushes 62.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. A housing for a power tool having a universal motor journaled in the housing, the motor having an armature and commutator affixed to an armature shaft, a pair of brushes operatively associated with the commutator, the housing comprising;
   a. walls defining an access aperture adjacent the brushes and commutator,
   b. a brush mounting means including a pair of members to hold each of the brushes and a pair of screws threadedly connected to the housing to clamp the members,
   c. a cover connected to the housing to enclose the aperture, and
   d. a post extending inwardly from the cover in superposition to each of said screws to prevent each of said screws from backing out of its threaded connection once the cover is connected to the housing.

2. The combination claimed in claim 1 wherein:
   a. said cover has a plurality of slots formed therein to permit ventilation air to flow therethrough.

3. The combination claimed in claim 1 wherein:
   a. such access aperture is defined at the end of the housing,
   b. the edges of at least two of said walls defining such access aperture are generally "U" shaped, and
   c. said cover is substantially "U" shaped to fit within the aperture and engage said generally "U" shaped wall edges.

4. The combination claimed in claim 3 wherein:
   a. said walls defining such access aperture more specifically define a pair of opposed side openings and an end opening,
   b. said cover has a pair of side faces and an end face, and
   c. said cover has a plurality of ventilation slots formed in said end face thereof.

5. A housing for a power tool having a bearing end and a drive end comprising:
   a. a top portion of the housing extending over the bearing end,
   b. a bottom portion of the housing extending under the bearing end, and
   c. sides interconnecting said top and bottom portions to define therewith an access aperture including opposed side openings and an end opening adjacent the bearing end and bounded by the top and bottom portions, and
   d. a cover connected to the housing and substantially "U" shaped to fit about the aperture.

6. The combination claimed in claim 5 wherein:
   a. a continuous lip is formed about the top and bottom portions, and
   b. the cover abuts the lip and forms a smooth outer surface at the joint line with said top and bottom portions of the housing.

7. The combination claimed in claim 5 wherein:
   a. a plurality of slots are formed in the cover to permit the passage of ventilating air therethrough.

* * * * *